D. R. HOLMES AND N. H. CAMPBELL.
WINDMILL.
APPLICATION FILED SEPT. 10, 1919.

1,374,659.

Patented Apr. 12, 1921.
3 SHEETS—SHEET 1.

Inventors
David R. Holmes & Nera H. Campbell.

D. R. HOLMES AND N. H. CAMPBELL.
WINDMILL.
APPLICATION FILED SEPT. 10, 1919.
1,374,659.
Patented Apr. 12, 1921.
3 SHEETS—SHEET 2.
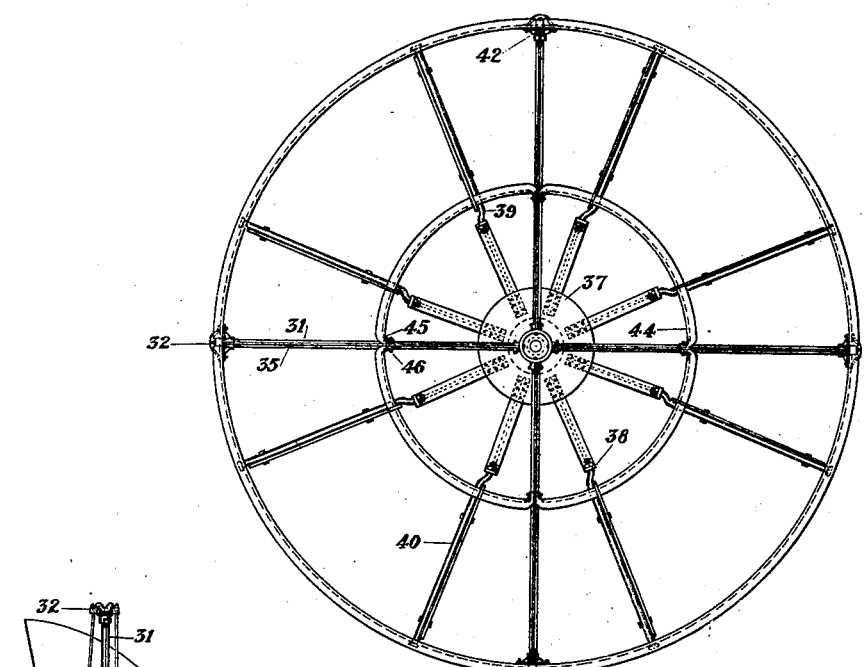
Fig. 4.
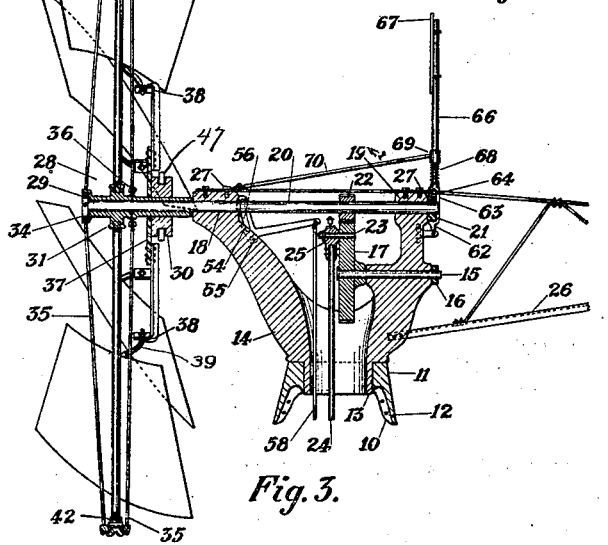
Fig. 3.
Inventors
David R. Holmes & Nera H. Campbell.
By 
Attorneys D. R. HOLMES AND N. H. CAMPBELL.
WINDMILL.
APPLICATION FILED SEPT. 10, 1919.
1,374,659.
Patented Apr. 12, 1921.
3 SHEETS—SHEET 3.
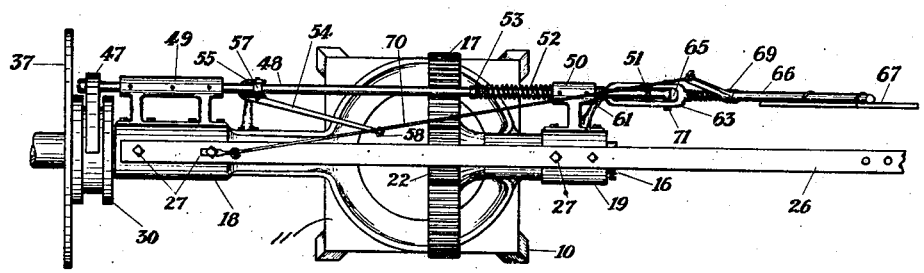
Fig. 5.
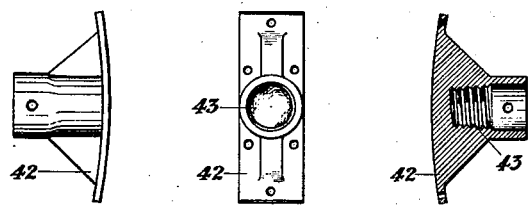
Fig. 6.
Fig. 7.
Inventors
David R. Holmes & Nera H. Campbell.
Attorneys

UNITED STATES PATENT OFFICE.

DAVID R. HOLMES AND NERA H. CAMPBELL, OF HUTCHINSON, KANSAS.

WINDMILL.

1,374,659.          Specification of Letters Patent.      Patented Apr. 12, 1921.

Application filed September 10, 1919. Serial No. 322,788.

*To all whom it may concern:*

Be it known that we, DAVID R. HOLMES and NERA H. CAMPBELL, citizens of the United States, residing at Hutchinson, in the county of Reno, State of Kansas, have invented certain new and useful Improvements in Windmills; and we do hereby declare the following to be a full, clear, and exact description of the invention, such as will enable others skilled in the art to which it appertains to make and use the same.

This invention comprehends an improved device or windmill for deriving power for pumping water for stock or other purposes or uses, from the action of the wind.

The invention consists or embodies more particularly an improved general construction of windmill permitting the use of wider sails than those of other windmills of the same size wheel, thereby giving more square surface feet exposed to the wind with a resultant increase in power generated; to provide an improved connection between the drive shaft and the pump or sucker rod employing gears, thereby obviating unnecessary friction and wear upon the bearings of the wheel and crank shaft of the windmill and insuring a direct and positive drive of high efficiency forming a free drive or connection between the pump rod and the pump from the gears which is obstructed by no friction of importance, except at the crank pin which serves to impart reciprocation to the pump rod; to provide means for adjusting the angular disposition of the sails or blades, so as to regulate the speed of operation according to the necessary capacity, from the ground, the device being more easily operated or manipulated to control the drive mechanism minutely so that the sails can be moved to the windward or either out of the wind or in alinement when inoperative; to provide means for normally holding the device in gear during the operation of the windmill and means for holding the same out of gear and locking the same in such position and, to provide a device of improved simple construction capable of economical manufacture and which will be strong and durable and efficiently carry out the intended purposes.

With the above and other objects in view, as will appear as the description proceeds, the invention comprises certain novel combinations and arrangement of parts as will be hereinafter more particularly described and claimed.

Reference is had to the accompanying drawings forming a part of this application wherein like reference characters designate corresponding parts throughout the several views, and wherein—

Fig. 3 is a vertical sectional view showing the sails or blades held to the wind angularly disposed, as distinguished from the position shown in Fig. 1 where the blades are shown edgewise and in Fig. 2 where the blades are shown disposed at right angles to the wheel.

Fig. 4 is a front elevation of the wheel showing the blades in the position of Fig. 2.

Fig. 5 is a top plan view of the device, the wheel being omitted to show the brake and gearing.

Fig. 6 shows detail views of the member 42.

Fig. 7 shows detail views of the member 32.

Figure 1:
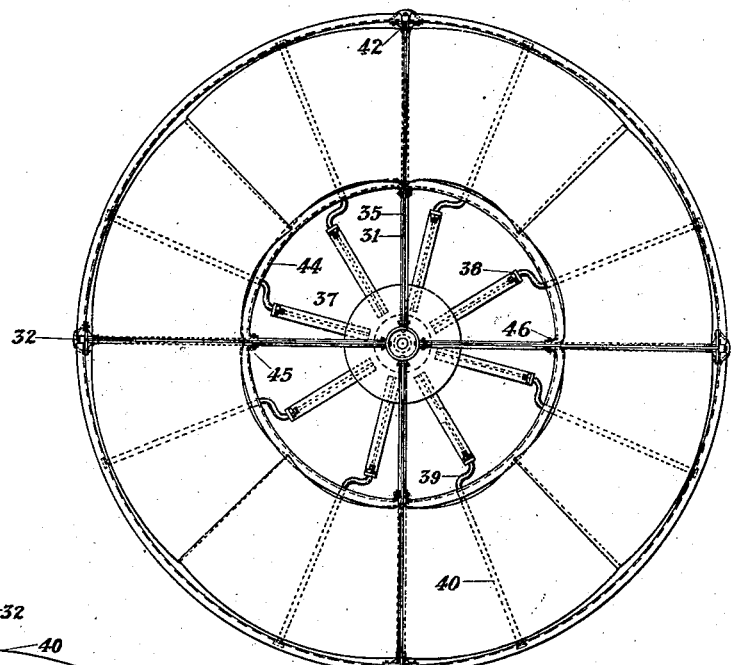
Figure 1 is a front elevation of the improved wheel.

Referring to the drawings in detail, our improved windmill is shown as comprising the usual mast or upright tower 10 constituting the frame work of any preferred construction. Mounted upon this tower is the frame base 11 preferably of cast iron of hollow or tubular formation having suitable flanged attaching members 12 for securing the same to the frame or tower 10. Received within the frame base 11 is a tubular extension 13 of the head 14 also of cast metal, of tubular or hollow construction.

Mounted horizontally and journaled in one side of the head is a stub shaft 15 retained in position by the collar 16 and carrying at one end, a cast iron spur gear 17 which is rotatable on the shaft. The frame is formed with a bearing for the shaft 15 and immediately above and parallel to it, is provided at the front and rear thereof in vertical alinement with the bearing for the shaft 15, bearings 18 and 19 for the main drive shaft 20 which is retained against longitudinal displacement by means of a collar 21 at its rear end, and which carries a spur pinion 22 in mesh with the spur gear 17, said pinion being fixed to the shaft. Connected to the gear 17 is a crank pin 23, the gear thus forming a crank disk which when rotated, will cause reciprocation of the pump or sucker rod 24 for operating a pump or other mechanism. The connection is made through the medium of a coupling or bearing 25 suitably secured against displacement and provided with suitable lubricating means, as indicated in the drawings.

Extending rearwardly from the head 14 is a vane support 26 comprising suitable strap irons, screwed or otherwise anchored to the frame as shown at 27, including a diagonal portion extending to the bottom of the head and a strap member extending between the bearings 18 and 19 at the top of the head. At the forward or outer end of the shaft 20, the windmill wheel 28 is supported, which includes a cast iron hub 29 fixed to the projecting end of the shaft 20 forwardly of the bearing 18 and in contact with the latter, while mounted on said hub is a grooved collar or block 30 also preferably of cast iron. The hub is provided with radiating sockets to which the spokes 31 are screwed, and each spoke is formed of a section of galvanized pipe of proper size and length, carrying on their outer extremities a rim 32, preferably of channel steel.

In connection with the outer channel bar rim 32, there are provided brace rod attaching blocks 32', one of which is disposed within the channel directly opposite the outer end of each spoke. Each of these blocks is of substantially M shape so that it includes ears 33 that lie against the outer side faces of the channeled rim. Through each ear 33 is a perforation or passage 33' and these perforations or passages receive brace rods 35 and 35' that are fore-and-aft of the spokes, respectively. The brace rods 35 are attached at their inner ends to the circumscribing flange 34 at the front end of the hub while the brace rods 35' are attached to the hub through the medium of eyes 36.

Connected to the block or collar 30 is a plate 37 provided for the sail shifting arms 38 and preferably constructed of plate steel. These arms are bolted to the plate and radiate therefrom over the collar or block 30, and are preferably formed of T steel, as regards their cross sectional outline, the outer ends thereof being directed forwardly at right angles, as shown at 38', to form bearings for crank portion 39 of rod 40 pivotally carried by the rim and bearing the sails or blades to permit angular adjustment thereof. These sails are preferably constructed of galvanized sheet iron, and constitute outer sectors of the segments of a circle, with their outer and inner edges concentrically formed with respect to the axis of the wheel, with the rods 40 bearing the same, bisecting them, so that the blades will project equidistantly on both sides and will slightly overlap when disposed edgewise around the wheel, in the manner shown in Fig. 1 of the drawings. In this position, the blades will be disposed edgewise at a minimum angle toward the wind and at their free edges, will be radially disposed against the respective spokes where such spokes are required, it being shown that only four of said spokes are provided where the rim sections are connected. To effect this connection, the meeting ends of the sections of the rim are brought together to engage coupling members or sockets 42 constituting splices, preferably of cast iron for receiving the threaded ends of the spokes in the internally threaded sockets thereof designated at 43 and with the plate portions disposed against the inner faces of the rim sections for connection by clamping members 43.

Spaced from the hub and outer rim is an intermediate or inside rim 44 also of channel steel and receiving the rods 40 therethrough, thus providing effective bearings for said rods whereby the sails or blades may be freely turned for adjusting the same in the desired angular relation. This inner rim is also formed of sections the extremities of which are turned inwardly as shown at 45 to encircle the spokes, at which point said sections are connected transversely through the spokes, as shown at 46.

In order to provide means for shifting the block or collar 30 in order to adjust the blades or sails as specified, there is engaged in the groove of the collar, a yoke 47 retained on the forward end of a rod 48 slidably supported in bearings 49 and 50 in the form of sleeves bolted to the bearings 18 and 19 and horizontally positioned in spaced relation with respect thereto so as to bring the parts in proper alinement. The rod is limited from forward displacement by a stop 51 but is normally held forwardly displaced by the expansive spring 52 coiled about the rod, preferably between the bearing 50 and collar 53 fixed to the rod. In order to shift the rod against action of the spring, there is provided an angle lever 54 pivoted at the point or bend thereof, as shown at 55, to the frame 14 constituting a super-frame or structure mounted upon the tower 10 which supports the mechanism at the proper elevation. One arm of the lever 54 is slotted as shown at 56 for engaging a block 57 fixed to the rod 48 and constituting a connection between said rod and the lever. To the free extremity of the other arm of the lever is connected a pull wire or other suitable connection 58 constituting a gear wire, by which pull thereon will serve to cause translation or longitudinal shifting of the rod 48 against the action of the spring and thus cause the shifting block or collar 30 to be moved longitudinally on the hub of the wheel, together with the shifting arms, whereby partial rotation or oscillation may be imparted to the cranks and rods, in connection with the retracting action of the spring.

Figure 2:
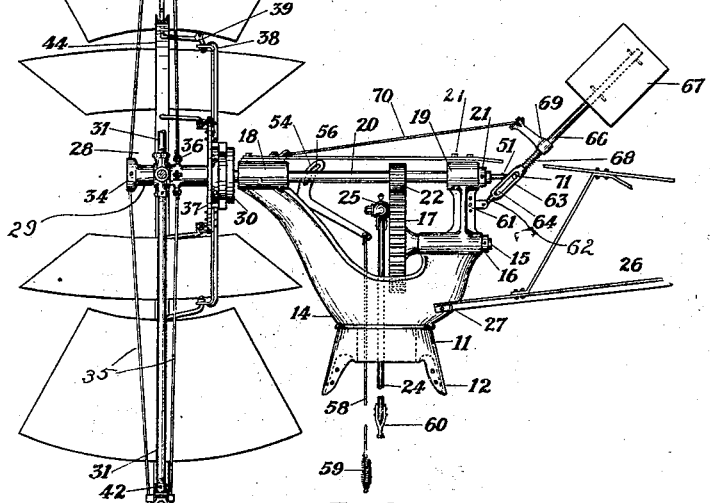
Fig. 2 is a side elevation of the invention, the frame or mast being omitted.

When the wire is pulled down it throws the mill out of the wind, as shown in Fig. 2 of the drawing, and when released the spring restores the wheel into position in the eye of the wind with the blades at the proper angle of incidence, so that the mill will operate. By reason of the arrangement of the blades as specified, much wider blades can be used than those of other mills of the same size wheel, thereby giving more square surface feet exposed to the wind and consequently greater power. Furthermore, importance attaches to the direct driving of the spur pinion and the gears which latter serves to reciprocate the pump or sucker rod. This provides a simple drive direct and free with but little friction and also avoids the direct crank connection with the shaft of the wheel such as causes distortion and undue wear of the parts, together with un-uniform pumping action. The adjustment may be accomplished easily and minutely from the ground, the wire being provided with a coil spring 59 at the platform end and the connecting rod constituting the pump or sucker rod 24, which is preferably constructed of wood, is provided with a swivel joint 60 as usual. It will thus be seen that we have provided a very efficient device for the purposes stated and for carrying out the objects specified.

Also, there is provided a governor to automatically throw the sails out of the wind when there is a high wind, so as to prevent injury to the windmill and the wind wheel thereof. That is, means are provided to throw the windmill out of operation by shifting the sails cross-wise at right angles to the wind wheel, and for this purpose there is pivoted to the bearing 19 through the medium of an arm or bracket 61, a pivoted arm 62 having an enlarged lower portion 63 provided with longitudinal slots 64 and 65. The slots 64 extend through the sides of the enlargement and communicate with the slot 65 which is disposed in the front of the enlargement. Mounted on the arm 62 is a tubular member 66 which carries the governor sail 67, preferably of sheet metal of suitable size or proportion as compared to the size of the wind wheel and windmill in its entirety. The enlargement 63 forms a shoulder between which and the lower end of the tubular member or arm section 66 a coil spring 68 is disposed upon the arm 62 and there is fixed to the tubular member a trip lever 69 which extends rigidly at right angles therefrom and is provided with an apertured free end receiving a rod 70 therethrough, said rod having an enlargement at its free end and being anchored at its opposite end to the bearing 18 by means of an eye bolt or the like. Thus, when there is a high wind, the wind will strike the sail 67 and swing the arm on its pivot from a vertical to an inclined position, in which movement it is limited by engagement with a cross pin 71 at the free end of the rod 48 in the slots 64, the rod 48 operating in the slot 65. During this movement the trip lever 69 will move over the rod 70 until it strikes the enlargement at the free end of said rod, when the trip lever, the tubular member 66 and the sail 67 will be turned edgewise to the wind, the rod 48 being shifted against the action of the spring 52 to throw the wind wheel out of the wind. This action is automatic but the parts can be returned to their initial position, when the spring 68 will operate to return the trip lever 69 to extend laterally as it travels over the rod 70 when the arm 62 moves to an upright position, thus disposing the sail 67 to face the wind and in position to re-act in case of a high wind to prevent injury to the working parts.

What is claimed is:

1. A windmill including a wheel comprising an outer rim, a central hub, spokes connecting the rim and hub, an inner rim between the outer rim and hub and concentric therewith, the inner rim consisting of segmental sections having their extremities turned toward the hub and attached in encircling pairs to the spokes respectively, and sails supported from the rims between the spokes.

2. A windmill including a wheel comprising an outer rim consisting of a channel bar with its channel directed outwardly, a hub, an inner rim between the outer rim and hub and concentric therewith, sails supported from the rims, and a block engaged in the channel of the outer rim at the end of each spoke and having perforated ears exteriorly of the rim, and brace rods engaged in the perforations of the ear and with the hub at corresponding sides of the spokes.

3. A windmill comprising a rotatable head having a shaft journaled therein, a wind wheel carried by the shaft and having sails shiftable into and out of the wind, a collar slidably mounted on the shaft, shifting mechanism for the sails connected with them and with the collar, a rod slidably connected with the head and operatively connected with the collar for actuating the sail shifting means, and a vane operatively connected to the rod and responsive to excessive wind pressure to operate the rod, the vane being rotatable responsive to increased wind pressure to move out of the wind.

4. In a windmill, the combination with a wheel having sails shiftable into and out of the wind, of a rockable and oscillatory vane, and connections between the vane and the sails for shifting them out of the wind in response to rocking movement of the vane, the vane being initially rockable under the influence of excessive wind pressure and subsequently rotatable under the influence of increased wind pressure.

5. A windmill comprising a wheel having sails shiftable into and out of the wind, a reciprocatory rod having connections with the sails for shifting them, means for holding the rod yieldably in position with the sails in the wind, a pivoted vane connected with the rod for movement of the rod with the sails out of the wind under the influence of excessive wind pressure against the vane, the vane being rotatably shiftable out of the wind under the influence of increased wind pressure thereagainst.

In testimony whereof, we affix our signatures, in the presence of two witnesses.

DAVID R. HOLMES.
NERA H. CAMPBELL.

Witnesses:
Mrs. W. A. HUXMAN,
AARON COLEMAN.